United States Patent Office 3,654,206
Patented Apr. 4, 1972

3,654,206
ALKOXYLATED PHOSPHATE ESTERS AS LEVELING AGENTS IN FLOOR POLISHES
Harry Kroll, Warwick, Alderic R. Therrien, Woonsocket, and Americo L. Forchielli, Cumberland, R.I., assignors to Philip A. Hunt Chemical Corporation, Palisades Park, N.J.
No Drawing. Filed Feb. 26, 1971, Ser. No. 119,341
Int. Cl. C08d 9/12; C08c 11/70
U.S. Cl. 260—27
11 Claims

ABSTRACT OF THE DISCLOSURE

Emulsion floor polish compositions comprising aqueous emulsions of water insoluble polymers, waxes and ammonia soluble resins and containing the ethoxylated, propoxylated and butoxylated derivatives of mono- and diesters of ortho phosphoric acid as the leveling agent therein; said leveling agent enabling said polishes to exhibit smooth, glossy, uniform films.

BACKGROUND OF THE INVENTION

Emulsion floor polishes are complex mixtures of polymers, waxes and/or wax-like materials and ammonia soluble resins. Leveling agents are also incorporated into these formulations in order to enable the polish to deposit smooth, continuous, flexible, high gloss films which do not craze or crack upon drying. For the past decade, tris(2-butoxyethyl) phosphate has been the only organic phosphate ester which was capable of supplying the necessary leveling properties to emulsion floor polish compositions.

Recently issued U.S. Pat. 3,503,912 has now disclosed the use of tris(2-hexoxyethyl) phosphate as a leveling agent. However, this material is expensive and appears to offer no significant advantages over tris(2-butoxyethyl) phosphate.

In addition, a series of organic phosphate esters have been tested to determine their leveling performance in emulsion floor polishes. The results of this study conducted by D. A. Lima and T. R. Hopper, which were published in Soap and Chemical Specialties, 42, 56 (1956), clearly indicated that none of the twenty-one compounds tested performed as well as tris(2-butoxyethyl) phosphate.

SUMMARY OF THE INVENTION

It is the primary object of this invention to provide an effective leveling agent for use in preparing improved emulsion floor polish compositions. Various other objects and advantages of this invention will become apparent from the following detailed description thereof.

Contrary to the teachings of the prior art, we have now, surprisingly, discovered that certain organic phosphate esters impart unusually good leveling properties when incorporated into emulsion floor polishes. Thus, these phosphate esters correspond to the formulae:

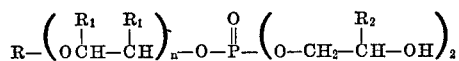

and

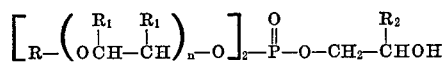

wherein R is a radical selected from the group consisting of straight chain and branched alkyl radicals containing from 4 to 16 carbon atoms, aryl radicals and aralkyl radicals;

$R_1$ and $R_2$ are independently selected from the group consisting of hydrogen atoms and methyl and ethyl radicals; and, $n$ is an integer having a value of from 0 to 6 inclusive.

DESCRIPTION OF PREFERRED EMBODIMENTS

Methods for preparing the alkoxylated phosphate ester leveling agents utilized herein are well known to those skilled in the art. Thus, a typical procedure involves reacting one mole of an appropriate alcohol with from about 0.33 to 0.50 mole of phosphorus pentoxide to produce a mixture of mono- and diesters corresponding to the formulae:

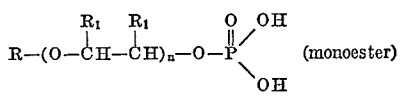
(monoester)

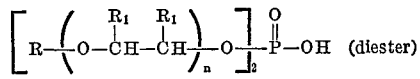
(diester)

wherein R is a radical selected from the group consisting of straight chain and branched alkyl radicals containing from 4 to 16 carbon atoms, aryl radicals and aralkyl radicals;

$R_1$ is independently selected from the group consisting of hydrogen atoms and methyl and ethyl radicals; and $n$ is an integer having a value of from 0 to 6 inclusive.

Typical R radicals include butyl, 2-ethylhexyl, octyl, isooctyl, nonyl, decyl, dodecyl, phenyl, octyl phenyl, mono- and dimethyl phenyl, nonyl phenyl, dinonyl phenyl and dodecyl phenyl radicals. The ratio of mono- and diester which occurs in these products varies according to the conditions and reagents utilized in the synthesis thereof. Additional information on these phosphate esters and methods for their preparation is provided in the article by David H. Chadwich and Richard S. Watt in "Phosphorus and Its Compounds," volume II, edited by John R. VanWazer, Interscience Publishers, New York.

The subsequent reaction of the mixture of organic acid phosphates with a 1,2-alkylene oxide to produce neutral trialkyl esters is fully described in U.S. Pat. 2,402,703. Thus, each ionizable proton in the acid phosphate group is replaced by a single mole of a 1,2-alkylene oxide, i.e. ethylene oxide, propylene oxide or butylene oxide. These reactions may be depicted as follows:

(1) For monoesters:

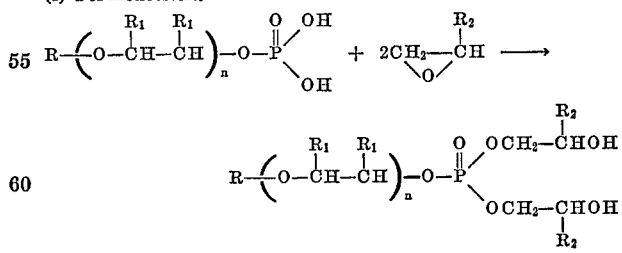

(2) For diesters:

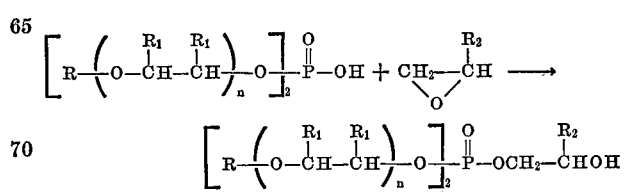

wherein R, $R_1$ and $n$ are as previously described and $R_2$ is selected from the group consisting of hydrogen atoms and methyl and ethyl radicals. The resulting alkoxylated phosphate esters are in the form of colorless or very light amber liquids.

Emulsion floor polish formulations are also well known to those skilled in the art. The emulsified thermoplastic resins utilized therein include polyacrylates, shellac-modified polystyrenes, polyacrylate-acrylonitrile copolymers, and the like. Applicable wax or wax substitutes include polyethylene emulsions, carnauba, paraffin, Fischer-Tropsch waxes, microcrystalline wax, and the like. These resins and waxes generally comprise about 75% and 90% of the total solids of the emulsion polish. Other additives include ammonia soluble resins such as styrene-maleic anhydride copolymers and partially esterified modified rosin; plasticizers; surfactants; solvents; masking agents; and the like. Additional information on emulsion floor polish formulations and methods for their manufacture can be obtained from various technical bulletins supplied by vendors in the field.

Excellent leveling properties are obtained when the alkoxylated phosphate esters are added to the emulsion floor polish compositions in concentrations ranging from about 0.1% to 3.0%, based on the total weight of the composition. Thus, the resulting polishes produce smooth, glossy, flexible films having good water resistance, abrasion resistance and easy removability. Furthermore, the wet polish films dry without crazing or cracking.

By way of specific illustration, a series of emulsion floor polish compositions was prepared which contained the alkoxy phosphate ester leveling agents of this invention. A control formulation containing tris(2-butoxyethyl) phosphate was prepared for comparative purposes. In these formulations, all parts given are by weight unless otherwise noted.

The performance characteristics of the resulting emulsion floor polish compositions were then evaluated by submitting the formulations to the following test procedures:

Gloss: The gloss and reflectance of a given formulation was determined by filming out the formulation at an application rate of 0.4 ml./8 sq. inch area on a black vinyl-asbestos tile, permitting the wet film to dry for 60 minutes and then visually comparing the gloss of the film with that of the control film, i.e. the film containing tris(2-butoxyethyl) phosphate. The results were recorded as "+" (better than control); "0" (equal to control); and "−" (poorer than control)

Leveling and appearance: The leveling properties of the floor polish sample and the appearance of the dried film were determined by filming the formulation at an application rate of 0.4 ml./8 sq. inch area on white vinyl and black asbestos tiles. The continuity and uniformity of the wet film and the appearance of the dried film were then observed.

The following scale was used to measure leveling performance and appearance:

Rating:    Description of rating
1 --- Perfect, no defects.
2 --- Excellent, slight defects.
3 --- Good, some film distortion at edges.
4 --- Fair, leveling action but film distortion.
5 --- Poor, unacceptable leveling and phase separation.

Water spot resistance: The polish sample was applied at an application rate of 0.4 ml./8 sq. inch area to black vinyl-asbestos tile and the film dried for one hour. Two drops of distilled water were applied to the surface and allowed to stand in contact therewith for five minutes. The subsequent appearance of the film was judged as follows:

Rating:                Appearance
1 ------------------ Perfect, no penetration.
2 ------------------ Perfect, slight penetration.
3 ------------------ Moderate penetration.
4 ------------------ Severe penetration.

Removability: The polish sample was applied at an application rate of 0.4 ml./8 sq. inch area to vinyl tile and the film allowed to dry for 48 hours. Thereafter, 0.4 mls. of 2% potassium oleate solution, pH 10, were applied to the film surface and percent film removed after 75 brush strokes on the surface was noted.

The various floor polish compositions prepared and their performance evaluations are noted in the following tables:

TABLE I.—PARTS

| | Formulation Number | | | | | | | | | | |
|---|---|---|---|---|---|---|---|---|---|---|---|
| | 1 | 2 | 3 | 4 | 5 | 6 | 7 | 8 | 9 | 10 | 11 |
| Acrylic interpolymer, emulsion, 15% solids | 34 | 34 | 34 | 34 | 34 | 34 | 34 | 34 | 34 | 34 | 34 |
| Acrylic interpolymer, emulsion, 15% solids | 34 | 34 | 34 | 34 | 34 | 34 | 34 | 34 | 34 | 34 | 34 |
| Ammonia soluble resin, 15% solids | 14.9 | 14.9 | 14.9 | 14.9 | 14.9 | 14.9 | 14.9 | 14.9 | 14.9 | 14.9 | 14.9 |
| Emulsifiable polyethylene emulsion, 15% solids | 10.3 | 10.3 | 10.3 | 10.3 | 10.3 | 10.3 | 10.3 | 10.3 | 10.3 | 10.3 | 10.3 |
| Diethylene glycol monoethyl ether | 1.4 | 1.4 | 1.4 | 1.4 | 1.4 | 1.4 | 1.4 | 1.4 | 1.4 | 1.4 | 1.4 |
| Ethylene glycol | 0.5 | 0.5 | 0.5 | 0.5 | 0.5 | 0.5 | 0.5 | 0.5 | 0.5 | 0.5 | 0.5 |
| Dibutyl phthalate | 0.4 | 0.4 | 0.4 | 0.4 | 0.4 | 0.4 | 0.4 | 0.4 | 0.4 | 0.4 | 0.4 |
| Alkyl aryl polyether alcohol | 0.3 | 0.3 | 0.3 | 0.3 | 0.3 | 0.3 | 0.3 | 0.3 | 0.3 | 0.3 | 0.3 |
| Cationic fluorocarbon surfactant (1%) | 0.4 | 0.4 | 0.4 | 0.4 | 0.4 | 0.4 | 0.4 | 0.4 | 0.4 | 0.4 | 0.4 |
| Water | 3.4 | 3.4 | 3.4 | 3.4 | 3.4 | 3.4 | 3.4 | 3.4 | 3.4 | 3.4 | 3.4 |
| Propoxylated 2-ethyl hexyl phosphate | 0.4 | | | | | | | | | | |
| Propoxylated iso-octyl phosphate | | 0.4 | | | | | | | | | |
| Propoxylated nonyl phosphate | | | 0.4 | | | | | | | | |
| Butoxylated 2-ethyl hexyl phosphate | | | | 0.4 | | | | | | | |
| Propoxylated butyl oxyethyl phosphate | | | | | 0.4 | | | | | | |
| Butoxylated butyl oxyethyl phosphate | | | | | | 0.4 | | | | | |
| Propoxylated hexyl phosphate | | | | | | | 0.4 | | | | |
| Propoxylated octyl decyl tetrakis(oxyethyl) phosphate | | | | | | | | 0.4 | | | |
| Propoxylated phenoxy ethyl phosphate | | | | | | | | | 0.4 | | |
| Propoxylated 2-ethylhexyl oxyethyl phosphate | | | | | | | | | | 0.4 | |
| Tri(2-butoxyethyl) phosphate | | | | | | | | | | | 0.4 |
| EVALUATION OF FLOOR POLISH FORMULATIONS | | | | | | | | | | | |
| Gloss | + | 0 | 0 | 0 | − | − | − | 0 | − | 0 | X |
| Leveling and appearance | 1 | 1 | 2 | 2 | 2 | 4 | 3 | 1 | 4 | 2 | 1 |
| Water spot resistance | 1 | 1 | 1 | 1 | 2 | 4 | 3 | 2 | 4 | 3 | 1 |
| Removability | 95 | 95 | 95 | 95 | 95 | 95 | 95 | 95 | 95 | 95 | 95 |

TABLE II.—PARTS

| | Formulation Number | | | | | | | | | | |
|---|---|---|---|---|---|---|---|---|---|---|---|
| | 12 | 13 | 14 | 15 | 16 | 17 | 18 | 19 | 20 | 21 | 22 |
| Acrylic interpolymer emulsion, 15% solids | 70.5 | 70.5 | 70.5 | 70.5 | 70.5 | 70.5 | 70.5 | 70.5 | 70.5 | 70.5 | 70.5 |
| Emulsifiable polyethylene, 15% solids | 10.7 | 10.7 | 10.7 | 10.7 | 10.7 | 10.7 | 10.7 | 10.7 | 10.7 | 10.7 | 10.7 |
| Ammonia soluble resin, 15% solids | 16 | 16 | 16 | 16 | 16 | 16 | 16 | 16 | 16 | 16 | 16 |
| Diethylene glycol monoethyl ether | 0.97 | 0.97 | 0.97 | 0.97 | 0.97 | 0.97 | 0.97 | 0.97 | 0.97 | 0.97 | 0.97 |
| Ethylene glycol | 0.97 | 0.97 | 0.97 | 0.97 | 0.97 | 0.97 | 0.97 | 0.97 | 0.97 | 0.97 | 0.97 |
| Propoxylated 2-ethyl hexyl phosphate | 0.38 | | | | | | | | | | |
| Propoxylated iso-octyl phosphate | | 0.38 | | | | | | | | | |
| Propoxylated nonyl phosphate | | | 0.38 | | | | | | | | |
| Butoxylated 2-ethyl hexyl phosphate | | | | 0.38 | | | | | | | |
| Propoxylated butyl oxyethyl phosphate | | | | | 0.38 | | | | | | |
| Butoxylated butyl oxyethyl phosphate | | | | | | 0.38 | | | | | |
| Propoxylated hexyl phosphate | | | | | | | 0.38 | | | | |
| Propoxylated octyl/decyl tetrakis(oxyethyl) phosphate | | | | | | | | 0.38 | | | |
| Propoxylated phenoxy ethyl phosphate | | | | | | | | | 0.38 | | |
| Propoxylated 2-ethyl hexyl oxyethyl phosphate | | | | | | | | | | 0.38 | |
| Tris(2-butoxyethyl) phosphate | | | | | | | | | | | 0.38 |

EVALUATION OF FLOOR POLISH FORMULATIONS

| | 12 | 13 | 14 | 15 | 16 | 17 | 18 | 19 | 20 | 21 | 22 |
|---|---|---|---|---|---|---|---|---|---|---|---|
| Gloss | + | + | + | + | − | 0 | − | 0 | − | 0 | X |
| Leveling appearance | 1 | 1 | 2 | 1 | 2 | 2 | 4 | 3 | 4 | 2 | 1 |
| Water spot resistance | 1 | 1 | 1 | 1 | 3 | 2 | 2 | 2 | 3 | 2 | 2 |
| Removability | 98 | 98 | 95 | 93 | 98 | 98 | 95 | 95 | 98 | 98 | 98 |

TABLE III.—PARTS

| | Formulation number | | | | | | | | | | |
|---|---|---|---|---|---|---|---|---|---|---|---|
| | 23 | 24 | 25 | 26 | 27 | 28 | 29 | 30 | 31 | 32 | 33 |
| Modified acrylic interpolymer emulsion (15% solids) | 76 | 76 | 76 | 76 | 76 | 76 | 76 | 76 | 76 | 76 | 76 |
| Emulsifiable polyethylene, 15% solids | 14 | 14 | 14 | 14 | 14 | 14 | 14 | 14 | 14 | 14 | 14 |
| Ammonia soluble resin, 15% solids | 6 | 6 | 6 | 6 | 6 | 6 | 6 | 6 | 6 | 6 | 6 |
| Propoxylated 2-ethyl hexyl phosphate | 0.8 | | | | | | | | | | |
| Propoxylated iso-octyl phosphate | | 0.8 | | | | | | | | | |
| Propoxylated nonyl phosphate | | | 0.8 | | | | | | | | |
| Butoxylated 2-ethyl hexyl phosphate | | | | 0.8 | | | | | | | |
| Propoxylated butyl oxyethyl phosphate | | | | | 0.8 | | | | | | |
| Butoxylated butyl oxyethyl phosphate | | | | | | 0.8 | | | | | |
| Propoxylated hexyl phsophate | | | | | | | 0.8 | | | | |
| Propoxylated octyl/decyl tetrakis (oxyethyl) phsophate | | | | | | | | 0.8 | | | |
| Propoxylated phenoxy ethyl phosphate | | | | | | | | | 0.8 | | |
| Propoxylated 2-ethylhexyl oxyethyl phosphate | | | | | | | | | | 0.8 | |
| Tris(2-butoxyethyl) phosphate | | | | | | | | | | | 0.8 |
| Styrene-maleic anhydride co-polymer, ammonia soluble (15% solids) | 6 | 6 | 6 | 6 | 6 | 6 | 6 | 6 | 6 | 6 | 6 |
| Dibutyl phthalate | 0.2 | 0.2 | 0.2 | 0.2 | 0.2 | 0.2 | 0.2 | 0.2 | 0.2 | 0.2 | 0.2 |
| Alkyl phenoxy-polyoxyethylene glycol | 0.2 | 0.2 | 0.2 | 0.2 | 0.2 | 0.2 | 0.2 | 0.2 | 0.2 | 0.2 | 0.2 |

TEST RESULTS

| | 23 | 24 | 25 | 26 | 27 | 28 | 29 | 30 | 31 | 32 | 33 |
|---|---|---|---|---|---|---|---|---|---|---|---|
| Gloss | + | + | + | − | − | − | 0 | − | − | + | X |
| Leveling and appearance | 1 | 1 | 1 | 1 | 3 | 2 | 3 | 2 | 4 | 2 | 2 |
| Water spot resistance | 1 | 1 | 1 | 1 | 3 | 2 | 2 | 2 | 3 | 2 | 1 |
| Removability | 95 | 95 | 95 | 90 | 95 | 90 | 95 | 95 | 95 | 95 | 95 |

TABLE IV.—PARTS

| | Formulation Number | | | | | | | | | | | |
|---|---|---|---|---|---|---|---|---|---|---|---|---|
| | 34 | 35 | 36 | 37 | 38 | 39 | 40 | 41 | 42 | 43 | 44 | 45 |
| Shellac modified styrene emulsion, 15% solids | 58 | 58 | 58 | 58 | 58 | 58 | 58 | 58 | 58 | 58 | 58 | 58 |
| Water | 8.5 | 8.5 | 8.5 | 8.5 | 8.5 | 8.5 | 8.5 | 8.5 | 8.5 | 8.5 | 8.5 | 7 |
| Emulsifiable polyethylene, 15% solids | 12 | 12 | 12 | 12 | 12 | 12 | 12 | 12 | 12 | 12 | 12 | 12 |
| Dibutyl phthalate | 0.5 | 0.5 | 0.5 | 0.5 | 0.5 | 0.5 | 0.5 | 0.5 | 0.5 | 0.5 | 0.5 | |
| Ammonia soluble resin, 15% solids | 20 | 20 | 20 | 20 | 20 | 20 | 20 | 20 | 20 | 20 | 20 | 20 |
| Propoxylated 2-ethyl hexyl phosphate | 1 | | | | | | | | | | | 3 |
| Propoxylated iso-octyl phosphate | | 1 | | | | | | | | | | |
| Propoxylated nonyl phosphate | | | 1 | | | | | | | | | |
| Butoxylated 2-ethyl hexyl phosphate | | | | 1 | | | | | | | | |
| Propoxylated butyl oxyethyl phosphate | | | | | 1 | | | | | | | |
| Butoxylated butyl oxyethyl phosphate | | | | | | 1 | | | | | | |
| Propoxylated hexyl phosphate | | | | | | | 1 | | | | | |
| Propoxylated octyl/decyl tetrakis (oxyethyl) phosphate | | | | | | | | 1 | | | | |
| Propoxylated phenoxy ethyl phosphate | | | | | | | | | 1 | | | |
| Propoxylated 2-ethylhexyl oxyethyl phosphate | | | | | | | | | | 1 | | |
| Tris(2-butoxyethyl) phosphate | | | | | | | | | | | 1 | |

TEST RESULTS

| | 34 | 35 | 36 | 37 | 38 | 39 | 40 | 41 | 42 | 43 | 44 | 45 |
|---|---|---|---|---|---|---|---|---|---|---|---|---|
| Gloss | + | + | 0 | 0 | − | 0 | − | − | − | 0 | X | + |
| Leveling and appearance | 1 | 1 | 1 | 1 | 3 | 2 | 3 | 3 | 4 | 2 | 1 | 1 |
| Water resistance | 1 | 1 | 1 | 1 | 3 | 2 | 3 | 2 | 3 | 2 | 1 | 1 |
| Removability | 100 | 100 | 100 | 100 | 100 | 100 | 100 | 100 | 100 | 100 | 100 | 100 |

The data summarized above clearly indicates the effective leveling properties provided by the alkoxylated phosphate esters as well as the generally excellent performance characteristics of the novel emulsion floor polishes of this invention. It is seen that combinations of floor polish emulsion ingredients compatible with the specified phosphate esters are manifold and that, within the defined bounds of the subject invention, a practitioner in the art can readily prepare optimum compositions based on the nature of the ingredients and the particular area of application.

Summarizing, this invention is seen to provide useful leveling agents for inclusion in emulsion floor polish compositions.

Variations may be made in proportions, procedures and materials without departing from the scope of the invention as defined by the following claims.

What is claimed is:

1. An aqueous emulsion floor polish composition comprising, as the major components therein, a water-insoluble polymer, a wax or wax-like material and an ammonia soluble resin, and containing from about 0.1% to 3.0%, based on the total weight of said composition, of at least one leveling agent corresponding to the formulae:

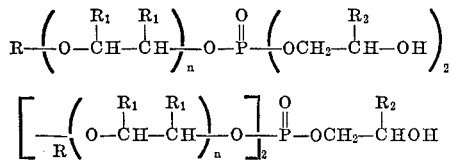

wherein

R is a radical selected from the group consisting of straight chain and branched alkyl radicals containing from 4 to 16 carbon atoms, aryl radicals and aralkyl radicals;

$R_1$ is independently selected from the group consisting of hydrogen atoms, and methyl and ethyl radicals;

$R_2$ is selected from the group consisting of hydrogen atoms, and methyl and ethyl radicals; and, $n$ is an integer having a value from 0 to 6 inclusive.

2. The floor polish composition of claim 1, wherein said leveling agent is a mixture of mono- and diesters of propoxylated 2-ethyl hexyl phosphate.

3. The floor polish composition of claim 1, wherein said leveling agent is a mixture of mono- and diesters of propoxylated iso-octyl phosphate.

4. The floor polish composition of claim 1, wherein said leveling agent is a mixture of mono- and diesters of propoxylated nonyl phosphate.

5. The floor polish composition of claim 1, wherein said leveling agent is a mixture of mono- and diesters of butoxylated 2-ethyl hexyl phosphate.

6. The floor polish composition of claim 1, wherein said leveling agent is a mixture of mono- and diesters of propoxylated butyl oxyethyl phosphate.

7. The floor polish composition of claim 1, wherein said leveling agent is a mixture of mono- and diesters of butoxylated butyl oxyethyl phosphate.

8. The floor polish composition of claim 1, wherein said leveling agent is a mixture of mono- and diesters of propoxylated hexyl phosphate.

9. The floor polish composition of claim 1, wherein said leveling agent is a mixture of mono- and diesters of propoxylated octyl/decyl tetrakis (oxyethyl) phosphate.

10. The floor polish composition of claim 1, wherein said leveling agent is a mixture of mono- and diesters of propoxylated phenoxy ethyl phosphate.

11. The floor polish composition of claim 1, wherein said leveling agent is a mixture of mono- and diesters of propoxylated 2-ethylhexyl oxyethyl phosphate.

References Cited

UNITED STATES PATENTS

| | | | |
|---|---|---|---|
| 3,290,264 | 12/1966 | Baranauckas et al. | 260—27 R |
| 3,247,141 | 4/1966 | Stryker et al. | 260—28.5 R |
| 3,352,805 | 11/1967 | Lima | 260—28.5 R |
| 3,455,704 | 7/1969 | Lima | 260—28.5 R |

MORRIS LIEBMAN, Primary Examiner

S. L. FOX, Assistant Examiner

U.S. Cl. X.R.

260—28.5 R, 28.5 A